`US005859640A`

United States Patent
de Judicibus

[11] Patent Number: 5,859,640
[45] Date of Patent: Jan. 12, 1999

[54] METHOD AND APPARATUS FOR WARNING A USER THAT FEEDBACK HAS BEEN PROVIDED IN A GRAPHICAL USER INTERFACE

[75] Inventor: Dario de Judicibus, Rome, Italy

[73] Assignee: International Business Machines Corporation, Armonk, N.Y.

[21] Appl. No.: 770,679

[22] Filed: Dec. 21, 1996

[30] Foreign Application Priority Data

Dec. 21, 1995 [IT] Italy ............................ MI95A2697 U

[51] Int. Cl.[6] .................................................. G06F 3/00
[52] U.S. Cl. ............................................ 345/347; 345/336
[58] Field of Search .................................. 345/347, 348, 345/349, 343, 344, 345, 336, 376, 352, 340, 339, 335, 326; 395/114, 113; 364/550

[56] References Cited

U.S. PATENT DOCUMENTS

| | | | |
|---|---|---|---|
| 5,428,734 | 6/1995 | Haynes et al. ........................... | 345/349 |
| 5,506,955 | 4/1996 | Chen et al. ........................ | 395/183.02 |
| 5,615,134 | 3/1997 | Newsham et al. ....................... | 364/550 |
| 5,630,125 | 5/1997 | Zellweger ............................... | 707/103 |
| 5,666,499 | 9/1997 | Baudel et al. ........................... | 345/347 |
| 5,699,494 | 12/1997 | Colbert et al. ........................... | 395/114 |
| 5,727,135 | 3/1998 | Webb et al. ............................. | 395/113 |

Primary Examiner—Raymond J. Bayerl
Assistant Examiner—Steven P. Sax
Attorney, Agent, or Firm—Ronald L. Drumheller

[57] ABSTRACT

A graphical user interface (GUI) for a data processing system which allows to monitor the feedbacks from the processes in execution through a window representation. Such GUI comprises means for warning the user that a feedback is received from one of the processes in an unobtrusive way. This avoids to the user to be obliged to suspend the current activities in order to handle the feedback message.

7 Claims, 4 Drawing Sheets

METHOD AND APPARATUS FOR WARNING A USER THAT FEEDBACK HAS BEEN PROVIDED IN A GRAPHICAL USER INTERFACE

TECHNICAL FIELD

This invention relates to the data processing field. More particularly, this invention relates to a method and apparatus for a graphic user interface.

BACKGROUND ART

Computer system that use what is known as a Graphical User Interface (GUI) first introduced by Apple and later adopted by IBM with OS/2 and Presentation Manager, and by Microsoft with its Windows program are a fairly recent addition to the state of the art. One common feature of these GUI systems is that a multitude of windows or viewports can be present simultaneously on the computer display screen.

Different application programs can be running (or waiting for input from the user) concurrently in each of the windows displayed on the computer display screen. In addition, a single application program can generate many different windows, thereby performing many different tasks.

While these GUI systems offer many advantage over more conventional operating systems such as DOS (which can only run and display one application program at a time), this additional function has created new problems for the user.

Typically a program interface provides users with feedback, for example, about what a program is doing, or if a problem occurred; this is a basic principle of usability. In particular, GUI systems allow programmers to use very intuitive and immediate techniques to inform users about the status of processing.

Nowadays in GUI systems, most interfaces display message boxes to provide such feedback.

However this solution involves in some problems. Usually the new displayed message box is presented on the top of previous displayed windows and becomes the active one. Consequently data of a previously displayed dialog window are often hidden by such a message box preventing a complete understanding of the reason of the message.

In addition the new box often prevents users from continuing their work with the interface. They must close the message box in order to go ahead. Then, if the user requires more feedback, a new message box is displayed. This is very annoying while an immediate complete feedback in real time and synchronised with user actions would be more helpful.

Moreover a message box is a static feedback, i.e. it is a frozen spot of a specific occurrence. There are cases where it could be necessary to receive continuously changing feedback. A known solution is the use of a "Progress Indicator" which avoids this problem by providing immediate, dynamic feedback of a time-consuming activity on the display screen. However, such a box is designed and used for very specific and limited activities, wherein there is less need of interaction with the contents of other windows and consequently the previously described disadvantages, which are in any case not solved, are less cumbersome. For example during an installation a Progress Indicator can be used for listing the files currently copied from the installation diskettes into the hard disk attached to the data processing system. Typically, a process which uses a Progress Indicator (e.g. an installation) does not require any interaction with the user for long time, leaving him free to perform other activities in different windows. This often causes the Progress Indicator to be partially or completely hidden. Then, when another feedback is sent by the process using the Progress Indicator, the Progress Indicator itself or another message box is immediately displayed to show the feedback as top window on the display screen, causing the disadvantages already described.

SUMMARY OF THE INVENTION

Hence, the present invention seeks to provide a message box capable of making promptly available to the user any kind of feedback reducing the inconveniences to his current activity.

According to an aspect of the present invention, there is provided a data processing system which comprises a graphic user interface managing output representation of processes in windows on a display screen, and which is characterised by further comprising warning means for warning a user in an unobtrusive manner that a feedback has been provided by a process.

Viewed from a second aspect, the present invention provides a method for operating a data processing system, provided with a graphic user interface, comprising the step of: displaying on a display screen in an unobtrusive manner a warning means for warning a user that a feedback has been provided by a process.

BRIEF DESCRIPTION OF THE DRAWINGS

The present invention will be described further, by way of example only, with reference to an embodiment thereof as illustrated in the accompanying drawings in which.

DETAILED DESCRIPTION OF THE PREFERRED EMBODIMENT

Figure 1:
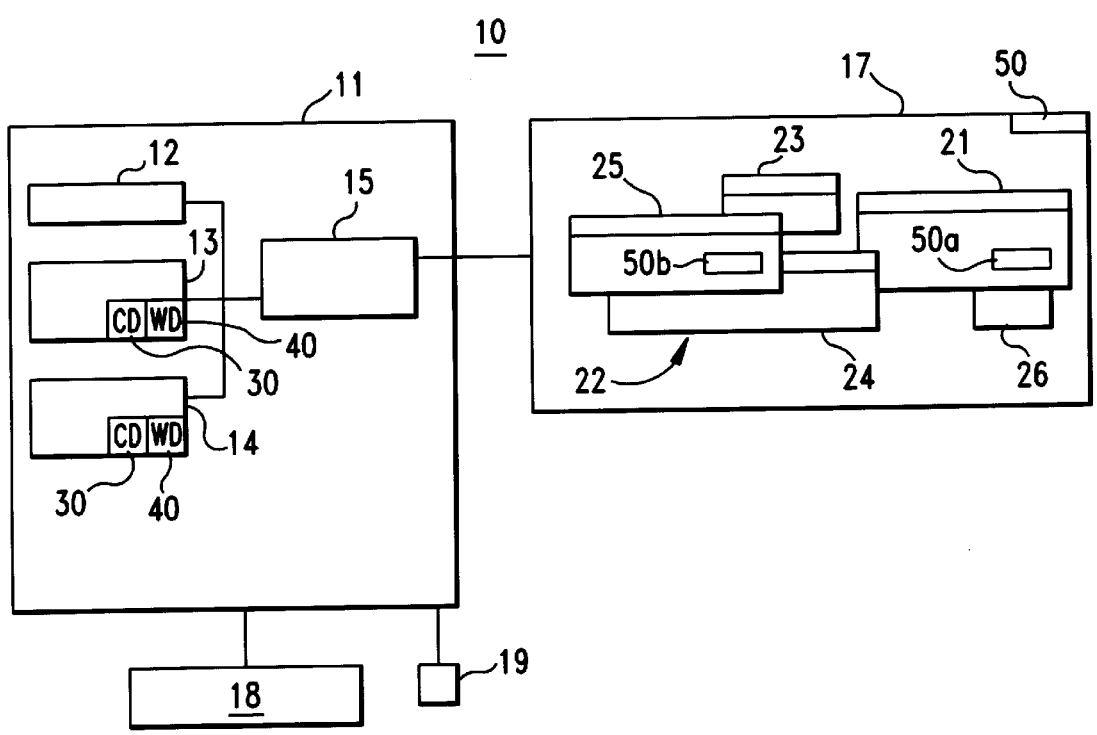
FIG. 1 is a block diagram of a data processing system according to an embodiment of the present invention.
Figure 2A:
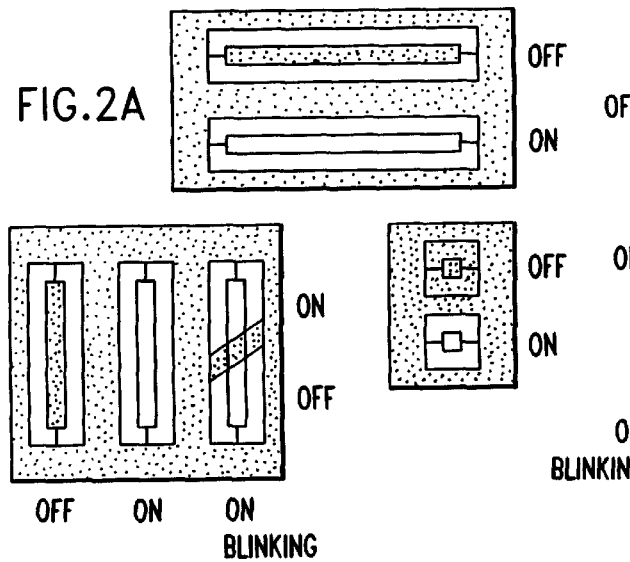
FIG. 2 shows a set of warning objects in accordance with an embodiment of the present invention.
Figure 2B:
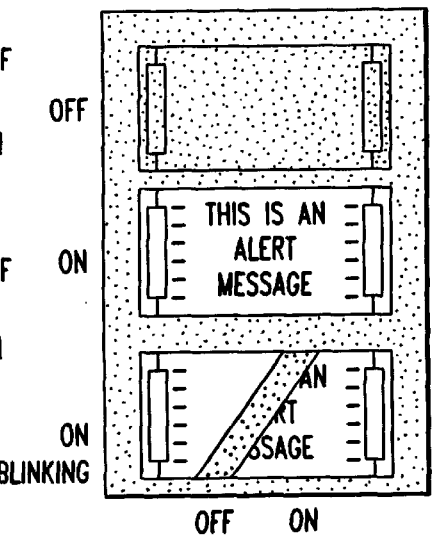
Figure 2C:
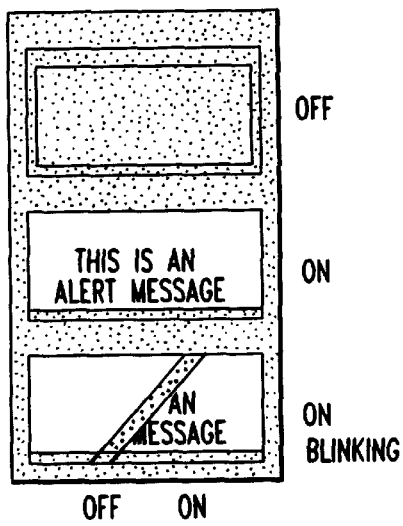
Figure 2D:
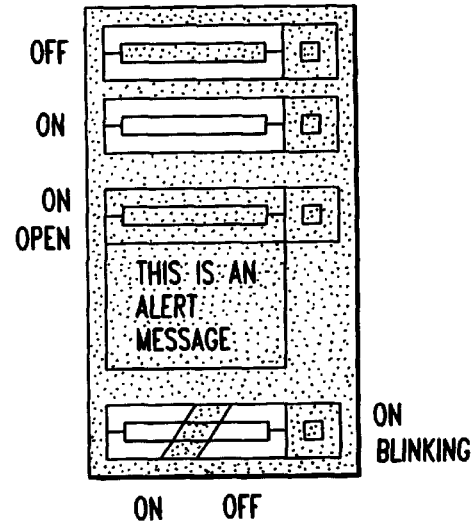

FIG. 1 shows a block diagram of a data processing system 10 according to an embodiment of the present invention. Data processing system 10 has display screen 17, keyboard 18, and input device 19, each of which is connected to a system unit 11. System unit 11 contains processor 12 connected to memory 13, storage 14 and display adapter 15. Processor 12 is suitably programmed to carry out this invention, as described in more detail in the flow diagram of FIG. 2. Storage 14 and memory 13 contain control data 30 and window data 40.

In a preferred embodiment, the data processing system 10 is an IBM PS/2, where processor 12 is an Intel Pentium microprocessor. Display adapter 15 is an IBM 8513 display adapter and display 17 is an IBM 8518 display. Input device 19 is preferably an IBM mouse but may be also a track ball, light pen or other input device. Disk 14 contains operating system software, preferably OS/2 with presentation Manager, as well as one or more OS/2 application programs such as Lotus 123.

Display screen 17 contains windows 21–26. For the purposes of this invention, a window or viewport can occupy anywhere from substantially all of the display screen to a very small portion of the display screen, and may be displayed in conjunction with other windows in a multitasking environment, such as OS/2 or in a single tasking environment such as DOS. As the number of windows increase will become more likely that many windows will become partially or completely obscured by other windows, as is shown in display 17 of FIG. 1. A warning object 50 (e.g. an icon) is graphically represented on the screen 17, moreover some additional warning object 50a and 50b are displayed on the associated windows 21 and 25. Such warning objects shall advise the user that a feedback provided by a process is available. A more detailed use of the warning objects will be described further with reference to FIG. 3.

Referring now to FIG. 2 examples of shapes of the warning object 50 are illustrated; those skilled in the art will appreciate that each shape can assume a plurality of different status which are not limited to the ones represented in FIG. 2.

Shape A shows objects represented as simple icons which look like stylised lamps. They could be horizontal, vertical, spherical as shown but other shapes can be used, as well. Shape A is used when a process intends to warn the user that a feedback has been provided but there is no need to make it immediately available. The default status of the lamp is OFF, so a warning for the availability of a feedback can be provided by switching the lamp ON, by making the light blinking, or by changing the colour of the light.

Shape B shows more complex objects which look like a neon sign. This shape can be used when there is a need to make immediately visible a very specific alert message to the user. Moreover shape B can be used for making available feedback containing longer messages or images or other bulky elements (e.g. button for additional help, tear-off dialog). For example, when the feedback is provided, the sign light is turned up and the message appears, in addition the sign can blink too or intermittently change the message text or cyclically display a scrolling long message text. Preferably the light area can be scrolled in any suitable direction to show a long message by means of a scroll bar. For example Shape C depicts two lateral scroll bars, but a man skilled in the art may appreciate that many other options are available.

Shape D is similar to Shape A but allows the user to open a pull-down curtain to display the feedback which can contain text only or any other element as Shape B above.

The warning objects 50 will be placed automatically of by user choice on the display screen 17 or in one or more windows (50a and 50b) as depicted in FIG. 1. Clearly the objects shall be visible when a feedback is available in order to warn the user. For example one warning object can be represented in a reserved fixed area of the desktop, for example the right top corner of the screen, so that no window or desktop object is allowed to hide such a representation. The man skilled in the art may appreciate that the warning object can be set as an object "always on top" as described for example in the Presentation Manager Programming Guide, IBM Part number G25H-7103. Than any time the warning object is hidden it is floated again on the top of the screen. If a warning object is placed inside a window, the window area covered by such a warning object will not be available for any other object or message, becoming part of the window itself, so when the user will combine the warning object with the window, he will be able to avoid any bad interference between the object and the windows contents.

Figure 3:
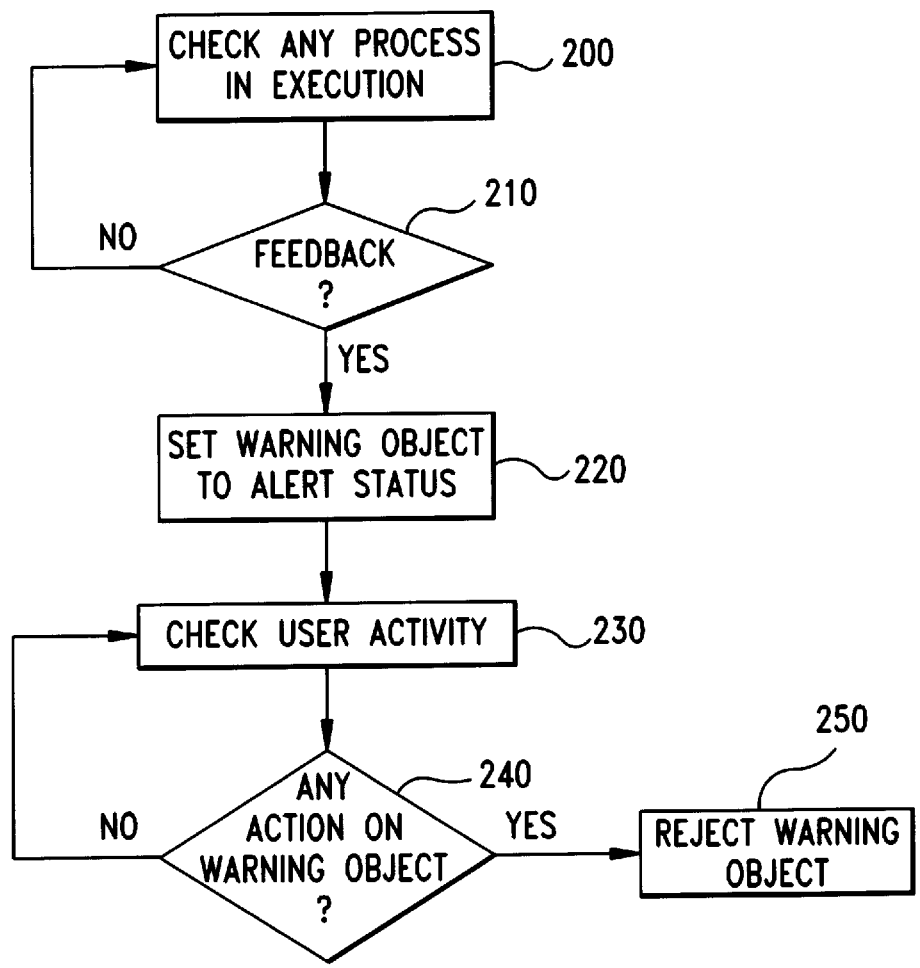
FIG. 3 is a flow diagram illustrating the method of operation of an embodiment of the present invention.

Referring now to FIG. 3 a method of operating the data processing system of FIG. 1 will be described. At step 200, the data processing system 10 checks if any of the processes in execution needs to make available to the user a feedback. The method iterates between step 200 and 210 till a feedback is provided. As soon as a feedback is made available by any of the processes, the control passes to step 220 wherein the warning object associated to the process providing the feedback is set into its alert status. So, according to the shapes disclosed with reference to FIG. 2, the warning object is switched ON. The man skilled in the art may appreciate that it is possible to associate all the processes or only a subset of them to only one warning object or associate one process with one warning object. This means that the feedback provided by a process is made available by means of the associated warning object.

At step 230, the data processing system 10 controls the user's activity in order to check when the user shows to be aware of the pending feedback, for example by checking when the user performs an activity on the alerted warning object. An illustrative list of activities is: double clicking on the warning object or scrolling the message displayed on the object. Then test 240 is executed to verify if any activity is performed on the warning object. If not, the control returns to step 230, if so the control passes to step 250 which resets the alert status of the checked warning object, ending the method. It is clear that the method described is repeated any time one of the processes in execution in the data processing system makes available a feedback, even if the previous execution(s) is/are not completed.

In another embodiment of the present invention a time limit is scheduled replacing step 230 and 240, so the warning object alerted in step 220 is automatically reset when a certain amount of time is passed.

Preferably, when the method, in any embodiment of the present invention, resets the status of the warning object, the displayed message, if any, is not discarded but is maintained in a list to allow the user a further exam of the message, if useful. In order to avoid long list only the most recent messages can be maintained.

Typically, if a warning object not yet reset receives a new feedback nothing happens to its graphical representation.

Figure 4:
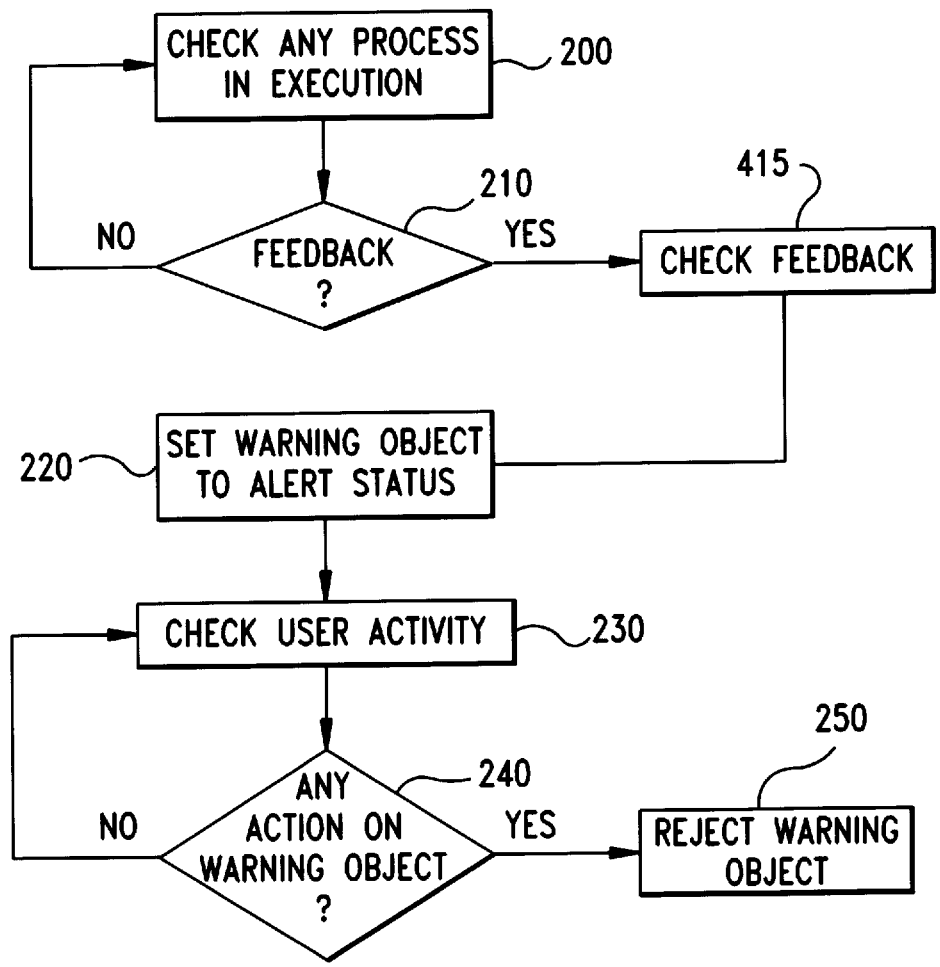
FIG. 4 is a flow diagram illustrating the method of operation of a preferred embodiment of the present invention.

Referring now to FIG. 4, a preferred embodiment of the present invention is described. The feedback conveys additional information which identifies its warning level. For instance a process may provide the user with a list of the currently performed activities or may just warn the user that a non fatal error has been detected or that a sort of default value has been used to auto-correct the problem. Then, under different conditions, the same process may warn the user that a fatal error occurred, causing a temporary stop or a crash of the process. Depending on the different kind of feedback, a different level of attention could be required.

The flow diagram depicted in FIG. 4 is similar to the one depicted in FIG. 3 except from the step 415. Hence, step 200 and test 210 are executed in sequence as in FIG. 3. Then, if test 210 verifies that a feedback is available, the control passes to step 415 wherein the information conveyed in the feedback are examined in order to extract associated alert level. In step 220 the warning object associated with the process providing the feedback is set in accordance with the extracted alert level. This means that according with the preferred embodiment, for each warning object it is available a plurality of different statuses identifying the proper alert level. For example, being any of the shapes of the warning object described with reference with FIG. 2 equally valid, alert level 1 can be a fixed object and alert level 2 can be the same object but blinking and alert level 3 the same blinking object but red. So in step 220 if the extracted alert level is equal to 3 the warning object associated to the process providing the feedback is converted from its OFF representation to its blinking and red one. Then the following steps 230, 240 and 250 are executed as described with reference with FIG. 3.

Preferably if the same warning object, not yet reset in step 250, receives a new feedback the warning object is set at the highest alert status between the new and the old status.

I claim:

1. A data processing system comprising a graphic user interface for managing output representation of a plurality of processes in corresponding different windows on a display screen, only one of the windows being currently active at any particular time, the other windows being currently inactive at said particular time, characterized by further comprising:

warning means for graphically warning a user that a feedback has been provided by a process corresponding to a currently inactive window, without making the currently active window inactive, said warning means including a warning object displayed on the display screen and having an OFF state and an ON state, said warning object being in said ON state when said process has provided said feedback and being in said OFF state when said process has provided no feedback that is not already known to the user.

2. A data processing system as claimed in claim 1 wherein the warning is displayed in a fixed position on the screen.

3. A data processing system as claimed in claim 1 wherein the warning object is associated with an area displayable at user's request and containing the feedback.

4. A data processing system as claimed in claim 1 wherein the warning object includes an area containing the feedback.

5. A data processing system as claimed in claim 1 wherein the warning object has at least two different ON states, corresponding to different alert statuses.

6. A data processing system as claimed in claim 5 wherein one of the ON states is blinking.

7. Method for operating a data processing system, provided with a graphic user interface that includes a plurality of different windows on a display screen, each said window providing output representation for a different process, only one of the windows being currently active at any particular time and the other windows being currently inactive at said particular time, comprising the step of:

displaying on the display screen a warning object for graphically warning a user that a feedback has been provided by a process corresponding to an inactive window, without making the currently active window inactive wherein the warning object has an OFF state and an ON state, said warning object being in said ON state when said process has provided said feedback and being in said OFF state when said process has provided no feedback that is not already known to the user.

* * * * *